(12) United States Patent
Chaoui

(10) Patent No.: US 7,821,325 B2
(45) Date of Patent: Oct. 26, 2010

(54) CHARGE PUMP CONVERTER AND METHOD THEREFOR

(75) Inventor: Hassan Chaoui, Toulouse (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 350 days.

(21) Appl. No.: 12/161,387

(22) PCT Filed: Jan. 31, 2008

(86) PCT No.: PCT/US2008/052559

§ 371 (c)(1),
(2), (4) Date: Jul. 18, 2008

(87) PCT Pub. No.: WO2009/099431

PCT Pub. Date: Aug. 13, 2009

(65) Prior Publication Data

US 2010/0225383 A1  Sep. 9, 2010

(51) Int. Cl.
*G05F 1/10* (2006.01)
(52) U.S. Cl. .................. 327/536; 327/537; 363/59; 363/60
(58) Field of Classification Search ......... 327/534–537, 327/589, 590, 390; 307/110; 363/59, 60
See application file for complete search history.

(56) References Cited

U.S. PATENT DOCUMENTS 6,995,995 B2 *  2/2006  Zeng et al. .................... 363/60
7,626,445 B2 * 12/2009  Lesso et al. .................. 327/536

* cited by examiner

*Primary Examiner*—An T Luu
(74) *Attorney, Agent, or Firm*—Robert F. Hightower

(57) ABSTRACT

In one embodiment, a charge pump converter is formed to use various values of an output voltage to selectively control a value of a charging current during a charging cycle of the charge pump converter.

19 Claims, 2 Drawing Sheets

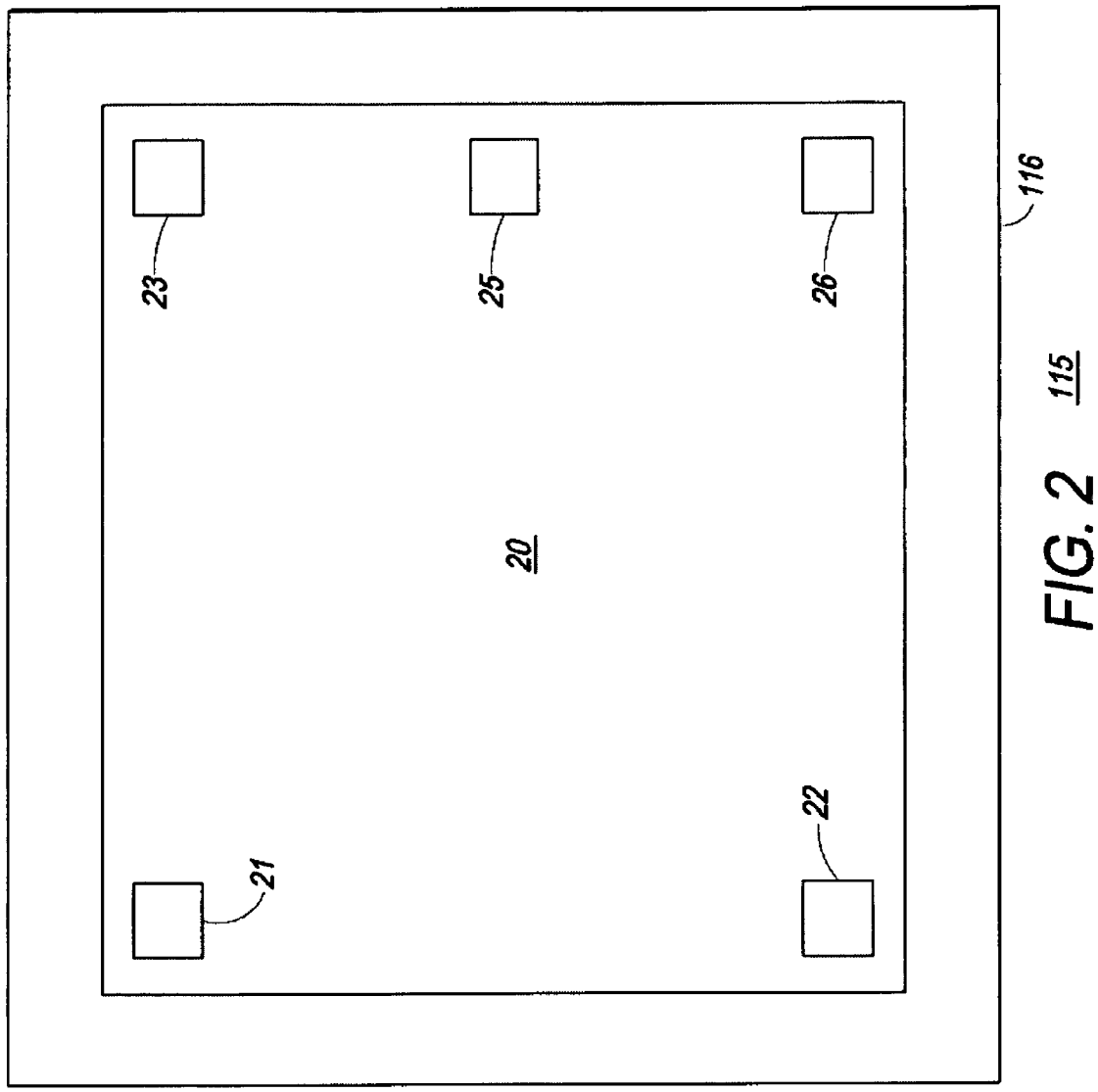

US 7,821,325 B2

CHARGE PUMP CONVERTER AND METHOD THEREFOR

BACKGROUND OF THE INVENTION

The present invention relates, in general, to electronics, and more particularly, to methods of forming semiconductor devices and structures.

In the past, the semiconductor industry utilized various methods and structures to form charge pump converter circuit. These charge pump converter circuits generally were used to receive a voltage from an energy source, such as a battery, and create various output voltages that were ratioed to the value of the input voltage. With the implementation of energy conservation specifications such as Energy-Star, it has become important for charge pump converters to more efficiently utilize the energy from the energy source. In some implementations, the charge pump converter monitored the value of the current supplied a load in order to adjust the amount of current supplied to the load. However, such implementations generally were not efficient enough to conform to all the energy conservation specifications.

Accordingly, it is desirable to have a charge pump converter that has high efficiency, and that has a low cost.

BRIEF DESCRIPTION OF THE DRAWINGS

FIG. 2 schematically illustrates an enlarged plan view of a semiconductor device that includes the charge pump converter of FIG. 1 in accordance with the present invention.

Figure 1:
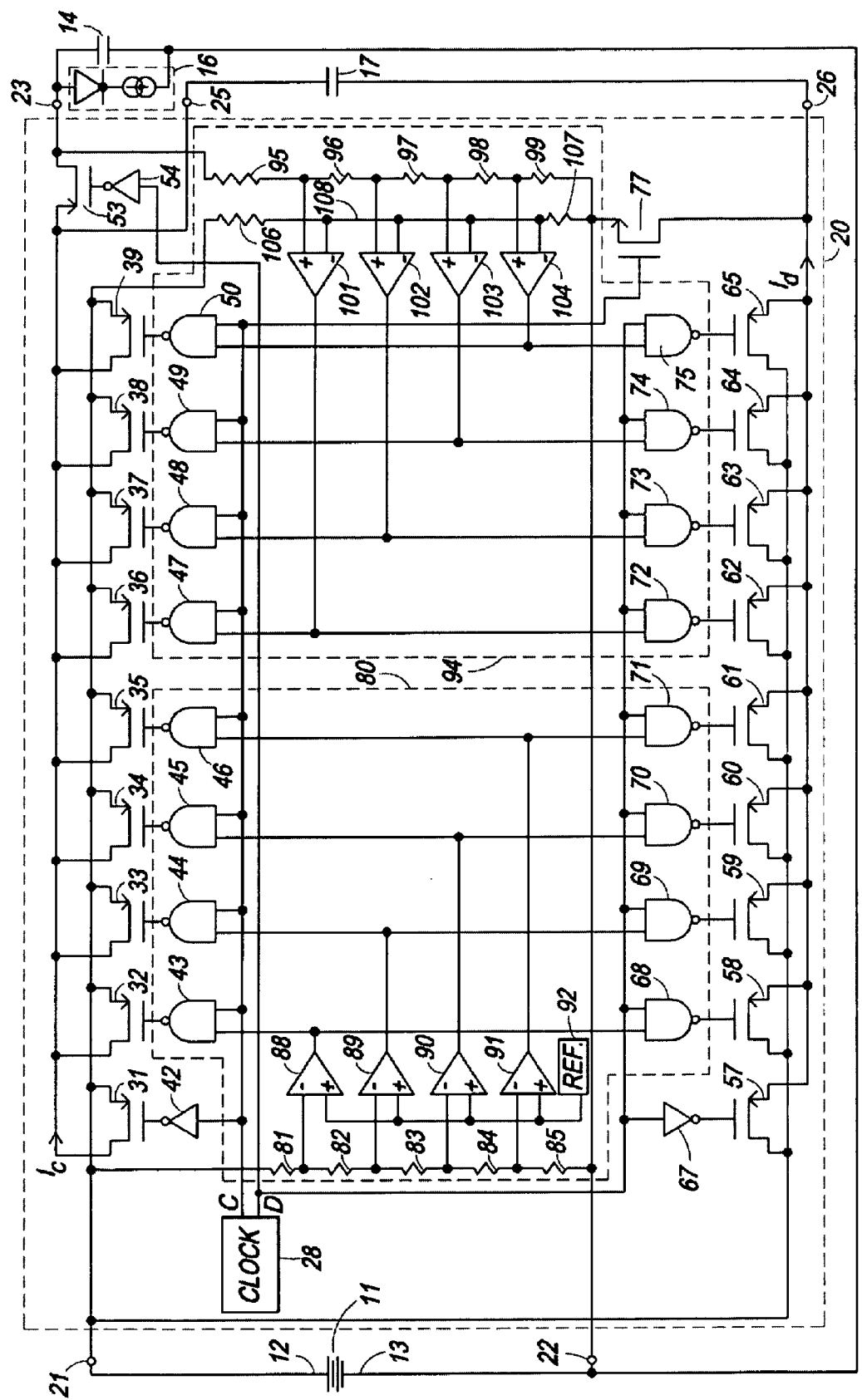
FIG. 1 schematically illustrates an embodiment of a portion of a charge pump converter system that includes a charge pump converter in accordance with the present invention.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated.

DETAILED DESCRIPTION OF THE DRAWINGS

FIG. 1 schematically illustrates an embodiment of a portion of a charge pump converter system 10 that receives an input voltage from a battery 11 and forms an output voltage across an output capacitor 14. System 10 includes a charge pump converter 20 that receives the input voltage from battery 11 and controls the charging of capacitor 14 in order to form the output voltage. Converter 20 controls the charging and discharging of a flying capacitor 17 in order to form the output voltage across capacitor 14. Capacitor 14 assists in supplying a load current and power to a load 16. Load 16 is illustrated to include a light emitting diode that is connected in series with a current source in order to emit light from the light emitting diode. However, those skilled in the art will appreciate that load 16 may be various other types of loads.

Charge pump converter 20 includes a plurality of transistors that are operably coupled to be selectively enabled according to various values of the input voltage received from battery 11. This plurality of transistors are selectively enabled to provide a charging current (Ic) to charge flying capacitor 17 during a charging cycle that is formed by converter 20. As the value of the input voltage decreases, converter 20 selectively increases the number of the plurality of transistors that are enabled in order to control the value of the charging current (Ic) supplied for charging capacitor 17. Converter 20 includes a voltage input 21 and a voltage return 22 that are connected to respective positive terminal 12 and negative terminal 13 of battery 11 in order to receive the input voltage. Capacitor terminals 25 and 26 of converter 20 are configured to be coupled to flying capacitor 17, and an output terminal 23 is configured to be coupled to capacitor 14 in order to charge capacitor 14 to the desired value of the output voltage.

Converter 20 includes a clock circuit or clock 28 that generates a plurality of clock signals including a charging clock (C) signal that is asserted during a charging cycle of converter 20, and a discharging clock (D) signal that is asserted during a discharging cycle of converter 20. The charging clock (C) signal and the discharging clock (D) signal typically are out of phase with each other and may include a small time interval in which both are not asserted in order to guarantee there is no overlap between the charging and discharging cycles. Transistors 31-39 are configured to supply a charging current (Ic) that is utilized to charge capacitor 17. Another plurality of transistors 57-65 are configured to supply a discharging current (Id) that is utilized to charge output capacitor 14 and to supply a current to load 16 from both flying capacitor 17 and battery 11. A control circuit 80 receives the input voltage and forms a plurality of control signals that assist in controlling the state of transistors 32-35 responsively to various values of the input voltage during the charging cycle and that assist in controlling the state of transistors 58-61 responsively to the various values of the input voltage during the discharging cycle. Circuit 80 includes a plurality of NAND gates 43-46 that assist in controlling the state of respective transistors 32-35 and a plurality of NAND gates 68-71 that assist in controlling the state of respective transistors 58-61. The example embodiment of circuit 80 that is illustrated in FIG. 1, includes a resistor divider of resistors 81-85 that forms four different sense signals that are representative of the instantaneous value of the input voltage, a reference generator or ref 92 that forms a reference signal, and comparators 88-91 that receive the four sense signals and compare them to the reference signal from ref 92.

Another control circuit 94 of converter 20 receives the output voltage and the input voltage and forms a plurality of control signals that assist in controlling the state of transistors 36-39 responsively to a difference between the input voltage and various values of the output voltage during the charging cycle and that also assist in controlling the state of transistors 62-65 responsively to the difference between the input voltage and the various states of the output voltage during the discharging cycle. Circuit 94 includes a plurality of NAND gates 47-50 that assist in controlling the state of respective transistors 36-39 and a plurality of NAND gates 72-75 that assist in controlling the state of respective transistors 62-65. The exemplary embodiment of circuit 94 illustrated in FIG. 1 includes a resistor divider of resistors 95-99 that receives the output voltage and forms various sense signals that are representative of instantaneous values of the output voltage and another resistor divider of resistors 106 and 107 that forms a reference signal on a node 108 that is representative of the value of the instantaneous value of the input voltage. A plurality of comparators 101-104 receive the sense signals from the resistor divider of resistors 95-99 and compare them to the reference signal from resistors 106-107 and form the plurality of control signals.

In operation, the charging clock (C) signal goes high to assert the C signal and the discharging clock (D) signal goes low to negate the D signal, and these states of the C and D signals indicate a charging cycle of converter 20. The low D signal forces the output of an inverter 54 high to disable a transistor 53. The low D signal also forces the output of inverter 67 high and the output of gates 68-75 high to disable all of transistors 57-65. The high C signal enables a transistor 77 which couples the bottom plate capacitor 17 to return 22. The high C signal also forces the output of inverter 42 low to enable transistor 31. Enabling transistor 31 couples terminal 25, thus the top plate of capacitor 17, to voltage input 21. Consequently, capacitor 17 is connected in parallel with battery 11 and charging current Ic flows from battery 11 through transistor 31 to output 25 in order to begin charging capacitor 17. Additionally, circuit 80 forms the plurality of control signals that determine the state of transistors 32-35 during this charging cycle. If battery 11 is charged to a high voltage, the voltage received on the inverting input of each of comparators 88-91 may be greater than the reference signal from ref 92, thus, the output of each of comparators 88-91 will be low. The low from comparator 88 forces the output of gate 43 high and disables transistor 32. Similarly, the low from the output of each of comparators 89-91 forces the output of each of respective gates 44-46 high to disable respective transistors 33-35. Because only transistor 31 is enabled, the value of charging current Ic is lower than the value would be if all of transistors 32-35 also enabled. If the value of the input voltage from battery 11 were lower, such that the inverting input of comparator 91 was less than the value of the reference signal from ref 92, the output of comparator 91 would be high. The high from comparator 91 and the high C signal would force the output of gate 46 low thereby enabling transistor 35. Enabling both transistors 31 and 35 in parallel reduces the series resistance of the transistors thereby increasing the value of charging current Ic for the lower value of the input voltage. If the value of the voltage from battery 11 even lower, the output of comparator 90 may also be forced high to additionally enable transistor 34 through gate 45 thereby further reducing the resistance and increasing the value of current Ic. A further decrease in the input voltage would force the output of comparator 89 to also go high and additionally enable transistor 33 through gate 44 and a further decrease in the input voltage would force the output of comparator 88 high to additionally enable transistor 32 through gate 43. As can be seen, each of transistors 32-35 are selectively enabled responsively to different values of the input voltage during the charging cycle in order to change the value of charging current Ic. When the value of the input voltage is high, the higher resistance formed by converter 20 slowly charges capacitor 17 and prevents a large spike or in-rush current. Selectively controlling the value of the charging current as the value of the input voltage decreases provides a longer life for battery 11 and more efficient operation for system 10.

Controller 94 also forms a plurality of control signals that are utilized to selectively enable transistors 36-39 during the charging cycle thereby further controlling the value of charging current Ic and limiting the value of the in-rush current. Assuming that output capacitor 14 is initially discharged and the output voltage is approximately zero volts (0V), the value of the input voltage is greater than the value of the output voltage and the reference signal received from the input voltage on node 108 and received by the inverting input of comparators 101-104 is greater than any of the sense signals received from the output voltage on the non-inverting input of comparators 101-104. Therefore, all of the control signals formed by comparators 101-104 are low or negated. The low from comparator 101 forces the output of gate 47 high to disable transistor 36. Similarly, the low from comparators 102-104 force the output of respective gates 48-50 high to disable respective transistors 37-39. Consequently, the control signals formed by circuit 94 selectively disable transistors 36-39 and do not affect the value of current Ic. If the value of the output voltage on capacitor 14 were greater, the sense signal on the non-inverting input of comparator 101 could be greater than the reference signal which would force the control signal on the output of comparator 101 high thereby enabling transistor 36 through gate 47. Enabling transistor 36 further reduces the series resistance and increases the value of charging current Ic responsively to the difference between the value of the input voltage and one value of the output voltage. If the value of the output voltage formed on capacitor 14 were greater, the output of comparator 102 may also go high thereby also enabling transistor 37 through gate 48 and further reducing the series resistance and increasing the value of current Ic. A further increase in the output voltage could additionally force the output of comparator 103 high thereby enabling transistor 38 through gate 49 while a further increase in the output voltage could also force the output of comparator 104 high and enable transistor 39 through gate 50. If the value of the input voltage increases so that the reference signal on node 108 is more than one of the values of the output voltage, comparators 101-104 are configured to selectively decrease the value of current Ic to prevent large currents from battery 11 to charge capacitor 17. Thus, circuit 94 is configured to selectively control the value of current Ic responsively to the difference between the input voltage and the values of the output voltage formed by resistors 95-99. When the value of the output voltage is lower than the different ratios or values of the input voltage, the lower resistance formed by converter 20 slowly charges capacitor 14 from battery 11 and capacitor 17 thereby preventing large current spikes or in-rush current. Selectively controlling the value of the charging current responsively to the difference between the input voltage and the values of the output voltage provides a longer life for battery 11 and more efficient operation for system 10.

After a first time interval, clock 28 forces the charging clock (C) signal low and subsequently forces the discharging clock (D) signal high to form a discharging cycle of converter 20. The low C signal forces the output of inverter 42 and the outputs of NAND gates 43-50 high thereby disabling all of transistors 31-39. The low C signal also disables transistor 77 which decouples capacitor 17 from return 22. The high D signal forces the output of inverter 54 low thereby enabling transistor 53 which couples terminal 23 to terminal 25 and the positively charged plate of capacitor 17. The high D signal also forces the output of inverter 67 low to enable transistor 57. Enabling transistor 57 couples the bottom or negatively charged plate of capacitor 17 to receive the input voltage from input 21 and supplies discharging current Id to begin charging capacitor 14 from capacitor 17 and battery 11. Circuit 80 forms the plurality of control signals to selectively enable transistors 58-61 responsively to the various values of the input voltage during the discharging cycle similarly to the description used for the plurality of the control signals of circuit 80 during the charging cycle. Consequently, for a first low value of the input voltage such that the signal on the inverting input of comparator 88 is less than the reference signal from ref 92, all of the control signals of circuit 80 are high thereby enabling all of transistors 58-61. For a higher input voltage value, comparator 88 may force a control signal low to disable transistor 58. A next higher input voltage value may force comparator 89 low to disable transistor 59 while an even higher input voltage value may force comparator 90 low to disable transistor 60 and an even higher input voltage value may force comparator 91 high to enable transistor 61. As can be seen, each of transistors 58-61 are selectively enabled responsively to different values of the input voltage during the discharging cycle in order to control the value of discharging current Id during the discharging cycle. When the value of the input voltage is high, the higher resistance formed by converter 20 slowly charges capacitor 14 from battery 11 and capacitor 17 thereby preventing large current spikes or in-rush current. Selectively controlling the value of the discharging current Id responsively to various values of the input voltage provides a longer life for battery 11 and more efficient operation for system 10.

During the discharging cycle, circuit 94 selectively enables transistors 62-65 responsively to the difference between the input voltage and the values of the output voltage similarly to the operation described for circuit 94 during the charging cycle. If the difference between the instantaneous value of the input voltage and the instantaneous value of the output voltage is low enough for the non-inverting input of comparator 101 to be less than the reference signal on node 108, all of comparators 101-104 are low thereby selectively disabling all of transistor 62-65. If the input voltage decreases or the output voltage increases (such as by charging capacitor 17), and the output voltage may reach a threshold defined as the ratio of the input voltage provided by the resistors, the output of comparator 101 may be forced high to enable transistor 62 through gate 72. Similarly, further increases of the output voltage (or a decrease of the input voltage) may reach a second, a third and a fourth threshold defined as a second, a third and fourth ratio or value of the input voltage and could cause comparators 102 then 103 then 104 to selectively enable respective transistors 63, 64, and 65. As can be seen, circuit 94 is configured to selectively control the value of current Id responsively to several or multiple differences between the instantaneous value of the input voltage and the instantaneous values of the output voltage. When the value of the output voltage is lower than different ratios of input voltage, the lower resistance formed by converter 20 slowly provides discharge current Id thereby preventing large current spikes or in-rush current. Selectively controlling the value of discharging current Id responsively to the difference between the input voltage and the values of the output voltage provides a longer life for battery 11 and more efficient operation for system 10.

In order to facilitate this functionality for converter 20, a charging clock output of clock 28 is commonly connected to a gate of transistor 77, an input of inverter 42, and an input each of gates 43-50. The output of inverter 42 is connected to a gate of transistor 31. A source of transistor 31 is commonly connected to input 21, a first terminal of resistor 81, a source of each of transistors 32-39, and a first terminal of resistor 106. A drain of transistor 31 is commonly connected to a drain of each of transistors 32-39, a source of transistor 53, and terminal 25. A discharging clock output of clock 28 is commonly connected to the input of inverter 54, an input of inverter 67, and a first input of each of gates 68-75. The inverting input of comparator 88 is connected to a second terminal of resistor 81 and a first terminal of resistor 82. The inverting input of comparator 89 is connected to a second terminal of resistor 82 and a first terminal of resistor 83. The inverting input of comparator 90 is connected to a second terminal of resistor 83 and a first terminal of resistor 84. The inverting input of comparator 91 is connected to a second terminal of resistor 84 and a first terminal of resistor 85 which has a second terminal connected to return 22. The output of ref 92 is commonly connected to the non-inverting input of comparators 88-91. The output of comparator 88 is commonly connected to a second input of gate 43 and a second input of gate 68. The output of gate 43 is connected to a gate of transistor 32 and the output of gate 68 is connected to a gate of transistor 58. The output of comparator 89 is commonly connected to a second input of gate 44 and a second input of gate 69. The output of gate 44 is connected to a gate of transistor 33 and the output of gate 69 is connected to a gate of transistor 59. The output of comparator 90 is commonly connected to a second input of gate 45 and a second input of gate 70. The output of gate 45 is connected to a gate of transistor 34 and the output of gate 70 is connected to a gate of transistor 60. The output of comparator 91 is commonly connected to a second input of gate 46 and a second input of gate 71. The output of gate 46 is connected to a gate of transistor 35 and the output of gate 71 is connected to a gate of transistor 61. A second terminal of resistor 106 is connected to node 108 and to a first terminal of resistor 107 which has a second terminal connected to return 22. A first terminal of resistor 95 is commonly connected to terminal 23 and a drain of transistor 53. A second terminal of resistor 95 is commonly connected to the non-inverting input of comparator 101 and a first terminal of resistor 96. A second terminal of resistor 96 is commonly connected to the non-inverting input of comparator 102 and a first terminal of resistor 97. A second terminal of resistor 97 is commonly connected to the non-inverting input of comparator 103 and a first terminal of resistor 98. A second terminal of resistor 98 is commonly connected to the non-inverting input of comparator 104 and a first terminal of resistor 99 which has a second terminal connected to return 22. The inverting input of comparator 104 is connected to node 108 and the output of comparator 104 is commonly connected to a second input of gate 50 and a second input of gate 75. The output of gate 50 is connected to a gate of transistor 39 and the output of gate 75 is connected to a gate to transistor 65. An inverting input of comparator 103 is connected node 108 and the output is commonly connected to a second input of gate 49 and second input of gate 74. The output of gate 49 is connected to a gate of transistor 38 and the output of gate 74 is connected to a gate of transistor 64. The inverting input of comparator 102 is connected to node 108 and the output is commonly connected to the second input of gate 48 and a second input of gate 73. The output of gate 48 is connected to a gate of transistor 37 and the output gate 73 is connected to a gate of transistor 63. The inverting input of comparator 101 is connected to node 108 and the output is commonly connected to a second input of gate 47 and a second input of gate 72. The output of gate 47 is connected to a gate of transistor 36 and the output of gate 72 is connected to a gate of transistor 62. A source of transistor 57 is commonly connected to terminal 26, a drain of transistor 77, and a source of each of transistors 58-65. A drain of transistor 57 is commonly connected to input 21 and a drain of each of transistors 58-65. The source of transistor 77 is connected to return 22. The output of inverter 54 is connected to the gate of transistor 53. The output of inverter 67 is connected to the gate of transistor 57.

FIG. 2 schematically illustrates an enlarged plan view of a portion of an embodiment of a semiconductor device or integrated circuit 115 that is formed on a semiconductor die 116. Converter 20 is formed on die 116. Die 116 may also include other circuits that are not shown in FIG. 2 for simplicity of the drawing. Converter 20 and device or integrated circuit 115 are formed on die 115 by semiconductor manufacturing techniques that are well known to those skilled in the art.

In view of all of the above, it is evident that a novel device and method is disclosed. Included, among other features, is configuring a circuit 80 to selectively enable different transistors of the plurality of parallel coupled transistors 32-35 responsively to different values of the input voltage in order to form charging current Ic to charge flying capacitor 17 during the charging cycle of converter 20. Using various values of the input voltage increases the efficiency, and also using the different between the input voltage and various values of the output voltage further increases the efficiency. Using comparators to and resistor dividers to form the various values and the control signals resulted in a simple configuration that has a low cost when integrated onto a silicon semiconductor die.

While the subject matter of the invention is described with specific preferred embodiments, it is evident that many alternatives and variations will be apparent to those skilled in the semiconductor arts. For example, circuits 80 and 94 may use other circuit configurations, instead of the resistor divides and the comparators, to form the various values on the input and output voltages. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A charge pump converter comprising:
an output terminal configured to be coupled to an output capacitor and form an output voltage on the output capacitor;
a plurality of terminals configured to be coupled to a flying capacitor;
a first plurality of transistors coupled to receive an input voltage and form a charging current to charge the flying capacitor wherein the first plurality of transistors are operably coupled to be selectively enabled responsively to values of the input voltage during a charging cycle of the charge pump converter;
a second plurality of transistors coupled to receive the input voltage and form the charging current to charge the flying capacitor wherein the second plurality of transistors are operably coupled to be selectively enabled during the charging cycle responsively to a difference between the input voltage and values of the output voltage;
a third plurality of transistors coupled to receive the input voltage and form a discharge current to discharge the flying capacitor to the output capacitor wherein the third plurality of transistors are operably coupled to be selectively enabled responsively to the values of the input voltage during a discharging cycle of the charge pump converter; and
a fourth plurality of transistors coupled to receive the input voltage and form the discharge current wherein the fourth plurality of transistors are operably coupled to be selectively enabled during the discharging cycle responsively to the difference between the input voltage and the values of the output voltage.

2. The charge pump converter of claim 1 further including a first control circuit configured to receive the input voltage and form a first plurality of control signals responsively to a plurality of values of the input voltage wherein the first plurality of control signals are coupled to the first plurality of transistors to selectively enable the first plurality of transistors responsively to the plurality of values of the input voltage.

3. The charge pump converter of claim 2 wherein the first control circuit includes a first plurality of comparators with each comparator of the first plurality of comparators coupled to revive a sense signal of a first plurality of sense signals wherein each sense signal is representative of a different value of the input voltage and wherein each comparator of the first plurality of comparators compares the sense signal to a first reference signal to form a control signal of the first plurality of control signals.

4. The charge pump converter of claim 3 wherein the first control circuit includes a first plurality of logic gates coupled to receive the plurality of control signals and receive a first clock signal that is representative of the charging cycle and enable the first plurality of transistors responsively to the values of the input voltage during the charging cycle.

5. The charge pump converter of claim 4 wherein the first plurality of control signals are coupled to the third plurality of transistors to selectively enable the third plurality of transistors responsively to the plurality of values of the input voltage during the discharging cycle.

6. The charge pump converter of claim 5 wherein the first control circuit includes a second plurality of logic gates coupled to receive the first plurality of control signals and receive a second clock signal that is representative of the discharging cycle and enable the third plurality of transistors responsively to the values of the input voltage during the discharging cycle.

7. The charge pump converter of claim 2 further including a second control circuit configured to receive the input voltage and the output voltage and form a second plurality of control signals responsively to the difference between the input voltage and the values of the output voltage wherein the second plurality of control signals are coupled to the second plurality of transistors to selectively enable the second plurality of transistors responsively to the difference between the input voltage and the values of the output voltage during the charging cycle.

8. The charge pump converter of claim 7 wherein the second control circuit includes a plurality of comparators with each comparator of the plurality of comparators coupled to revive a sense signal that is representative of a different value of the output voltage and wherein each comparator of the plurality of comparators compares the sense signal to a reference signal that is representative of the input voltage to form a control signal of the second plurality of control signals.

9. The charge pump converter of claim 8 wherein the second control circuit includes a first plurality of logic gates coupled to receive the second plurality of control signals and receive a first clock signal that is representative of the charging cycle and enable the second plurality of transistors responsively to the difference between the input voltage and the values of the output voltage during the charging cycle.

10. The charge pump converter of claim 9 wherein the second control circuit includes a second plurality of logic gates coupled to receive the second plurality of control signals and receive a second clock signal that is representative of the discharging cycle and enable the fourth plurality of transistors responsively to the difference between the input voltage and the values of the output voltage during the discharging cycle.

11. A charge pump converter comprising:
an output terminal configured to be coupled to an output capacitor and form an output voltage on the output capacitor;
a plurality of terminals configured to be coupled to a flying capacitor;
a first plurality of transistors coupled to receive an input voltage and form a charging current to charge the flying capacitor wherein the first plurality of transistors are operably coupled to be selectively enabled responsively to values of the input voltage during a charging cycle of the charge pump converter; and
a second plurality of transistors coupled to receive the input voltage and form the charging current to charge the flying capacitor wherein the second plurality of transistors are operably coupled to be selectively enabled during the charging cycle responsively to a difference between the input voltage and values of the output voltage.

12. The charge pump converter of claim 11 wherein the first plurality of transistors are operably coupled to be selectively enabled responsively to values of the input voltage includes each transistor of the first plurality of transistors coupled to be selectively enabled responsively to a different value of the input voltage.

13. The charge pump converter of claim 12 wherein a first transistor of first plurality of transistors is operably coupled to be selectively enabled responsively to a first value of the input voltage, a second transistor of first plurality of transistors is operably coupled to be selectively enabled responsively to a second value of the input voltage, a third transistor of first plurality of transistors is operably coupled to be selectively enabled responsively to a third value of the input voltage, and a fourth transistor of first plurality of transistors is operably coupled to be selectively enabled responsively to a fourth value of the input voltage wherein the first value is greater than the second value, the first value is greater than the second value, the second value is greater than the third value, and the third value is greater than the fourth value.

14. The charge pump converter of claim 11 further including a third plurality of transistors coupled to receive the input voltage and form a discharge current to discharge the flying capacitor to the output capacitor wherein the third plurality of transistors are operably coupled to be selectively enabled responsively to the values of the input voltage during a discharging cycle of the charge pump converter; and a fourth plurality of transistors coupled to receive the input voltage and form the discharge current wherein the fourth plurality of transistors are operably coupled to be selectively enabled during the discharging cycle responsively to the difference between the input voltage and the values of the output voltage.

15. A method of forming a charge pump converter comprising:
providing an output terminal configured to be coupled to an output capacitor to form an output voltage on the output capacitor;
providing a plurality of terminals configured to be coupled to a flying capacitor; and
configuring a first circuit to selectively enable different transistors of a first plurality of parallel coupled transistors responsively to different values of the input voltage in order to form a charging current to charge the flying capacitor during a charging cycle of the charge pump converter.

16. The method of claim 15 further including configuring the first circuit to selectively enable different transistors of a second plurality of parallel coupled transistors responsively to different values of the input voltage in order to form a discharge current to charge the output capacitor from the flying capacitor during a discharging cycle of the charge pump converter.

17. The method of claim 15 wherein configuring the first circuit to selectively enable different transistors of the first plurality of parallel coupled transistors includes configuring the first circuit to form a plurality of sense signals that each represent different values of the input voltage and compare each sense signal to a reference signal to form a plurality of control signals.

18. The method of claim 15 further including configuring a second circuit to selectively enable different transistors of a second plurality of parallel coupled transistors responsively to a difference between the input voltage and different values of the output voltage in order to form the charging current to charge the flying capacitor during the charging cycle.

19. The method of claim 18 further including configuring the second circuit to selectively enable different transistors of a third plurality of parallel coupled transistors responsively to the difference between the input voltage and different values of the output voltage in order to form a discharging current to charge the output capacitor from the flying capacitor during the discharging cycle.

* * * * *